Figure 9:
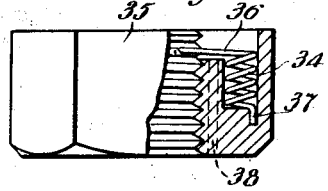

M. JACOBS.
LOCKING MEANS FOR SCREW THREADED PARTS.
APPLICATION FILED JULY 29, 1910.
1,191,427.
Patented July 18, 1916.
2 SHEETS—SHEET 1.
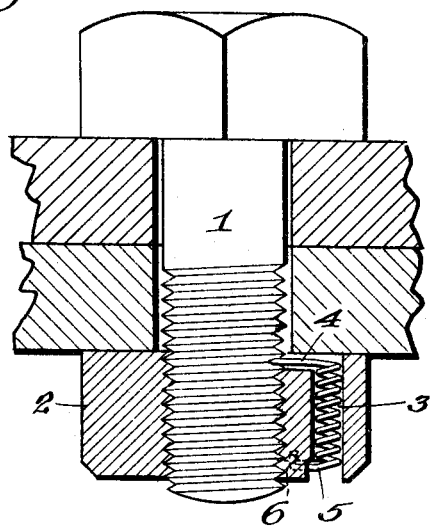
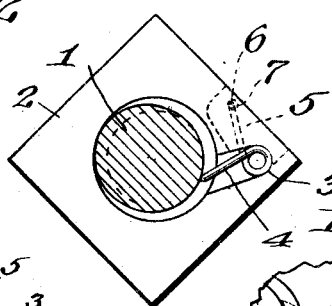
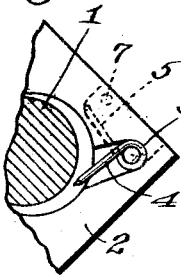
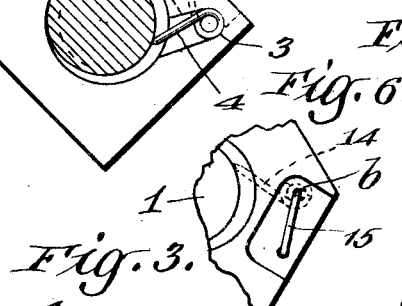
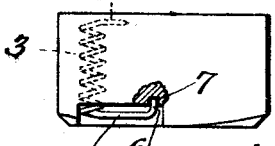
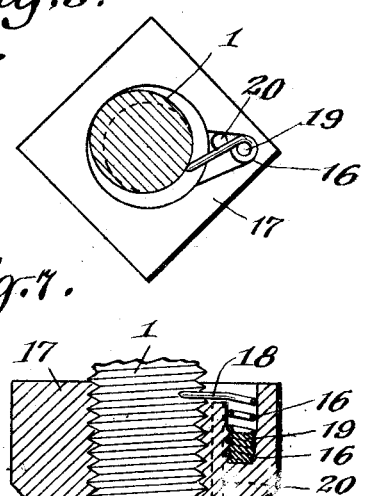
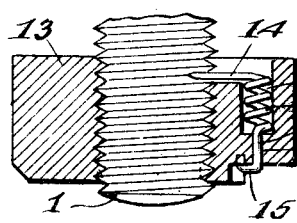
WITNESSES
INVENTOR
Morris Jacobs
BY
ATTORNEY M. JACOBS.
LOCKING MEANS FOR SCREW THREADED PARTS.
APPLICATION FILED JULY 29, 1910.

1,191,427.

Patented July 18, 1916.
2 SHEETS—SHEET 2.

Inventor:
Morris Jacobs
By Arthur Phelps Marr
Atty.

UNITED STATES PATENT OFFICE.

MORRIS JACOBS, OF BROOKLYN, NEW YORK.

LOCKING MEANS FOR SCREW-THREADED PARTS.

1,191,427. Specification of Letters Patent. Patented July 18, 1916.

Application filed July 29, 1910. Serial No. 574,447.

*To all whom it may concern:*

Be it known that I, MORRIS JACOBS, a citizen of the United States of America, residing in the borough of Brooklyn, city of New York, in the county of Kings and State of New York, have invented certain new and useful Improvements in Locking Means for Screw-Threaded Parts, of which the following is a specification, reference being had therein to the accompanying drawings, forming part thereof.

My invention relates to means for locking from unintentional relative rotation two screw-threaded engaging parts such as bolts and nuts.

In coöperative screw-threaded parts, particularly in bolts and nuts as found on the market, there are variations in the actual dimensions of the screw-threaded portions thereof supposed to be of the same size, and because of this lack of uniformity in dimensions the locking means commonly provided are defective in their locking functions.

One of the objects of my present invention is to provide locking means which will effectively lock whether the coöperative screw-threaded parts fit together tightly or loosely.

It is common and usually desirable to have the locking member spring pressed and this result has been accomplished either by employing a separate spring of the proper resiliency for pressing a rigid locking member into locking engagement or by employing a locking member embodying in itself the necessary resiliency by which it is pressed into locking engagement. The former construction is usually complicated, liable to derangement and expensive. The latter construction is subject to the defect that if the resilient or spring locking member be sufficiently flexible and yieldable to bring about locking engagement then such member will not be sufficiently rigid and resistant to provide a secure lock, and vice versa, and the objectionable results of this defect have been accentuated by the variations in relative size of the coöperative screw-threaded parts hereinabove noted.

Therefore, another of the important objects of my invention is to provide resilient locking means which shall combine a maximum of rigidity and resistance to thereby provide a secure lock, with a maximum of yieldability and flexibility in bringing about locking engagement.

Another serious defect in this general class of devices has been the usual inaccessibility for release of the locking means, and another object of my invention is to provide for the convenient unlocking or release of the locking means.

Other objects and advantages of my invention will appear from the following description.

I shall now describe the accompanying drawings illustrating several embodiments of my invention and shall thereafter point out my invention in claims.

Figure 10:
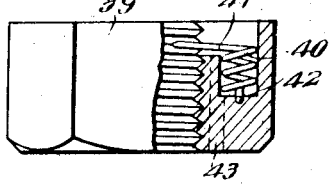
Figure 11:
Figure 12:
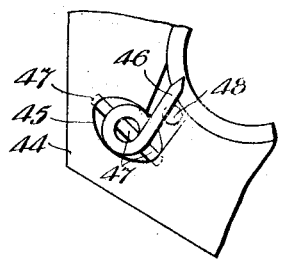
Figure 13:
Figure 14:
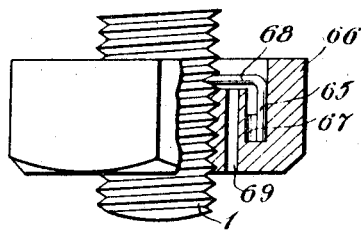
Figure 15:
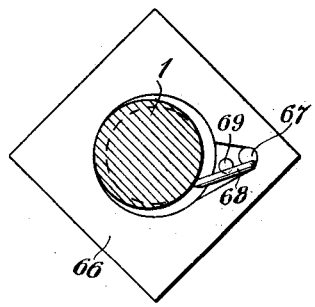
Figure 16:
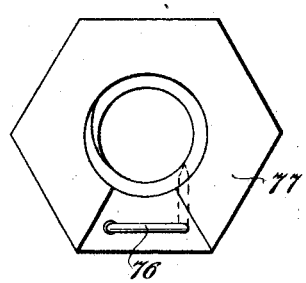
Figure 17:
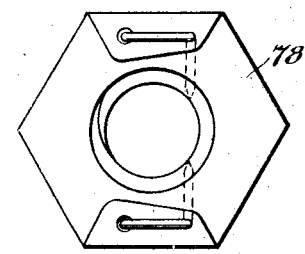
Figure 18:
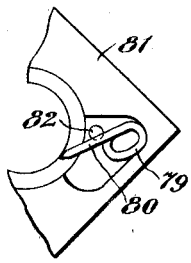
Figure 19:
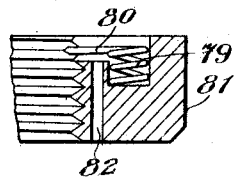

Figure 1 is a longitudinal section partly in elevation showing a self-locking nut locked on a bolt and co-acting with the bolt in clamping two objects together. Fig. 2 is a cross-section through the bolt at the inner face of the nut as viewed from above in Fig. 1. Fig. 3 is an elevation, partly in section, of the nut alone as viewed diagonally downward from the right in Fig. 2. Fig. 4 is a view similar to Fig. 2, but partly broken away and with the locking member shown as moved to non-locking position. Fig. 5 is a longitudinal section partly broken away of a modified construction in which the rockable torsional spring actuating stem is composed in part of a coil and in part of a straight wire. Fig. 6 is an inverted plan view, partly broken away, of the construction shown at Fig. 5. Fig. 7 is a longitudinal section, partly broken away, of a modification having a coiled torsional spring stem which is not an actuating stem. Fig. 8 is a cross-section through the bolt at the inner face of the nut as viewed from above in Fig. 7. Fig. 9 is a longitudinal section partly in side elevation of a self-locking nut embodying a modification of the construction shown at Figs. 7 and 8. Fig. 10 is a similar view of a further modification in the same respect. Fig. 11 is an inverted plan view of the locking member which appears in elevation in Fig. 10. Fig. 12 is a plan view partly broken away, of the inner side of a self-locking nut embodying a further modification along the lines of construction shown at Figs. 7, 9 and 10. Fig. 13 is a side elevation of the locking member as viewed diagonally upward from the left in Fig. 12, but showing the locking member in its form previous to insertion in the nut. Figs. 14 and 15 are similar views, respectively, showing modified means of securing in place a locking member having a torsional spring stem which is not an actuating stem. Fig. 16 is a plan view of a nut having a slightly modified recess for containing the actuating lever. Fig. 17 is a plan view of a modified nut wherein two locking members of reverse construction are employed for locking the nut against rotative movement in either direction. Fig. 18 is a plan view partly broken away of the inner face of a self-locking nut embodying a modification along the same general lines as shown in Figs. 7 and 8 and 9 to 13, inclusive. Fig. 19 is a longitudinal section partly broken away of what is shown at Fig. 18.

My invention is capable of embodiment in a very simple construction for fully carrying out the foregoing objects.

My broad invention in its most complete embodiment consists of a combined resilient torsional stem and rockable actuating stem which extends longitudinally of a screw-threaded part carrying the locking member, such stem being provided at a suitable inner point with locking means, there being provided releasable means for holding the stem against rotation at another suitable point. It is therefore to be noted that the stem serves the double purpose of a torsion spring for holding the locking member in engagement and also of an actuating stem for moving the locking means into locking position or for releasing such means from locking engagement. Constructions embodying this complete idea are illustrated at Figs. 1 to 6, inclusive, and 7, and are also incidentally shown at Fig. 16, showing slight modifications in the releasable holding means for the stem. It is, however, entirely within the broader scope of my invention to modify the construction so as to eliminate or omit from the stem of the locking member either its function as an actuating means for actuating the locking means or its other function as a torsional spring for pressing the locking means into locking position. Constructions embodying the former idea are illustrated at Figs. 7 and 8, 9 to 13, inclusive, 14 and 15, 18 and 19; these constructions being directed to include particularly the resilient feature of the stem. A construction directed more particularly to the latter feature, that of the stem serving the purpose of actuation, is shown at Fig. 17.

In the most complete illustrated embodiment of my invention shown at Figs. 1 to 4, inclusive, of the accompanying drawings an ordinary bolt 1 has screwed and locked thereon a self-locking nut 2, which is provided with a locking member. The bolt 1 constitutes an inner screw-threaded part and the nut 2 constitutes an outer screw-threaded part engaging therewith. The locking member is shown as including a helical spring coil 3 rotatively received into a corresponding bore shown as extending through the nut 2 longitudinally thereof from end to end substantially parallel with the bolt-receiving aperture. The inner end turn of the coil 3 projects laterally substantially tangentially to form a locking tongue 4, which extends inwardly, as shown, through a recess formed in the inner face of the nut, and which extends transversely of the screw-threaded parts from the inner end of the cylindrical coil-receiving hole to the bolt-receiving aperture. The locking tongue 4 projects slightly into the bolt hole of the nut and engages the threads of the bolt 1 at a locking angle, the locking tongue having a tapered locking end which fits between the threads of the bolt, as clearly shown in Figs. 1 and 2. At its other or outer end the coil 3 has its end turn shown as extended substantially tangentially and extending transversely of the screw-threaded parts to form a laterally projecting actuating lever or actuating arm 5, which is shown as received into a countersunk recess on the outer face of the nut, such recess being shown as extending from the cylindrical coil-receiving hole to and along the outer edge of the nut, but not extending inward to the bolt-receiving aperture of the nut, so that it has an inner shoulder outwardly therefrom. As shown in this embodiment of the invention the locking tongue 4 and the actuating lever 5 lie at opposite sides of a plane coincident with the common axis of the bolt 1 and nut 2 and also coincident with the axis of the helical coil 3. It is seen from this that, if the actuating lever 5 be moved away from the inner screw-threaded part or bolt 1, any torsional strain or torque on the coil 3 will be increased and the tapered point of the locking tongue 4 will be thereby pressed against the threaded portion of the bolt 7; and contra, if the actuating lever 5 be moved inward toward the bolt 1 then the torsional or twisting strain on the coil 3 will be lessened. Latching means are provided for releasably engaging the actuating lever 5 and holding it away from the bolt 1 to thereby press the tapered locking point of the locking tongue 4 into locking engagement between the threads of the bolt 1. Such means are shown as comprising an inwardly turned end 6 forming a latch at the extremity of the actuating lever 5 and a latch-receiving socket 7 in the actuating-lever-receiving recess near the outer edge of the nut and which serves as a keeper for the latch 6. The helical coil 3 constitutes a combined resilient torsional stem and rockable actuating stem, such stem carrying at its inner end locking means exemplified in the locking tongue 4, and at its outer end carrying actuating means provided with releasable holding means, as exemplified in the actuating lever 5 and the latching means therefor hereinbefore described. The torsional tension or rotative adjustment of the helical coil 3 is such that when the latching end 6 of the actuating lever 5 is engaged in the keeper socket 7, as shown at Figs. 1, 2 and 3, the locking tongue 4 will have proper locking engagement with the bolt 1, as shown at Figs. 1 and 2; and when the latch 6 is disengaged from the keeper socket 7 and the actuating lever 5 is moved inward against the shoulder formed by the outer recess just outward from the bolt hole, then the point of the locking tongue 4 will be moved out of contact with and will not form a locking engagement with the threads of the bolt, although the tapered end of the locking tongue may still extend slightly into the groove formed between two of the threads of the bolt, this unlocked position of the locking member being illustrated at Fig. 4. The torsional coil 3 in its function as a spring element to press the locking tongue into locking engagement, because of its great resiliency and flexibility, is of special utility both in taking up wear and in accommodating itself to the variations in actual dimensions of the screw-threaded portions of the screw-threaded parts hereinbefore mentioned. The locking tongue 4 is sufficiently rigid and resistant to reliably perform its locking functions, and yet, as just described, it is pressed into its locking engagement with great resiliency and so as to permit of a large amount of self-adjustment. In the resisting part of its function the locking tongue is strongly and unyieldingly supported by the wall at the back of the inner recess which forms a continuation of the cylindrical side wall of the coil-containing hole, the locking tongue to this extent acting alone; whereas in the resilient part of its function the locking tongue has at its service the entire spring coil 3. That is to say, the locking tongue 4 is rigidly supported against end thrust and very yieldably and resiliently mounted for swinging movement. The location of the locking means, such as the tongue 4, at a point removed from the outer end of the screw-threaded part, such as within the recess at the inner end of the nut, as shown, effectively protects this most important part of the locking member in all respects and also, when the locking member is carried by the outer screw-threaded part, such as a self-locking nut, as is shown in the illustrated embodiments of the invention, the performance of the locking function is assured regardless of whether or not the nut is screwed to its full extent upon the bolt 1.

In operation, the locking member may be set to locking position before the nut is screwed on, as indicated at Fig. 3, or the nut may be screwed on first and then the locking member set to locking position, as shown at Figs. 1 and 2, but usually the former method is probably the most convenient. To remove or loosen the nut the outer end portion of the actuating lever 5 is raised until the latch 6 is lifted out of the keeper socket 7 and the actuating lever is then moved inwardly toward the bolt 1. This inward movement of the actuating lever rotatably rocks the coiled stem 3 and thereby moves the locking tongue 4 out of locking engagement with the threads of the bolt 1, as shown at Fig. 4. The inward movement of the actuating lever is limited by the shoulder at the inner side of the recess containing the said lever, but the extent of such movement permitted is ample to fully release the locking tongue 4 from engagement so as to allow the nut to be freely unscrewed. The countersinking of the actuating lever 5 in the outer face of the nut serves both to protect such lever and to remove any possibility of it ever being in the way of any other part. The inner shoulder of the countersunk recess obviates any break in the continuity of the threads of the nut and presents no chance for the actuating lever 5 ever getting in a position so as to project over the bolt hole in the path of the advancing bolt as the nut is screwed on.

The end of any suitable tool may be inserted under the actuating lever 5, that is, between such lever and the nut, to first raise the actuating lever and then to move it inward, a single swinging movement of the tool being all that is required to perform the two operations of unlatching or releasing the latch 6 and of swinging inward the actuating lever 5. To render easy the insertion of such releasing tool the actuating lever 5 is slightly spaced away from the bottom of its containing recess, as most clearly seen at Fig. 3.

Because of the above described manner of construction by reason of which the stem portion 3 of the locking member extends through the nut 2 and the locking tongue 4 projects laterally behind the inner end of the nut and the actuating lever 5 projects laterally at the front of the outer face of the nut, it will be observed that the locking member can never become detached from the nut but will at all times remain a permanent part thereof, obviating all liability of loss of the locking member. This feature of permanency of the locking member in the nut is common to all of the illustrated embodiments of the invention.

The locking member is self-tightening, that is to say, if the nut be inadvertently left loose, it will tighten or screw up of its own accord, instead of working off, when subjected to jars or vibrations. By the same action, a nut which is tight or screwed up, such as is shown at Fig. 1, will not only remain tight but will have a constant tendency to tighten. This advantageous result takes place in the case of all of the several illustrated embodiments or modifications of the invention shown in the accompanying drawings.

The stem-containing cylindrical hole and the recesses at the ends thereof are located in a corner of the nut, thereby obviating any weakening of the nut, and this manner of construction is observed with all of the embodiments or modifications shown. The locking-member-containing hole and recesses may be formed in any way found most convenient and inexpensive by those skilled in the art, but the preferable method would probably be to stamp out such hole and recesses concurrently with the stamping out of the nut blank.

The construction just described in reference to Figs. 1 to 4, inclusive, has been found in practice to fulfil all of the objects and requirements of the invention as hereinbefore set forth. However, the modified constructions now to be described constitute advantageous practical embodiments of the invention which under some practical circumstances it might be desirable to use.

The modified construction illustrated at Figs. 5 and 6 combines in a single locking member a combined resilient torsional stem and rockable actuating stem 12, which consists in part of a spring coil $a$ such as is found in the first described construction, and in part of a straight wire portion $b$ such as is found in the last described construction, the two stem parts $a$ and $b$ being concentric, as more clearly indicated in dotted lines at Fig. 6. The stem 12 extends longitudinally of the nut 13 and passes rotatably through a hole extending through the nut from end to end substantially parallel with the bolt-receiving aperture, this stem-containing hole having, as shown, an enlarged inner portion for receiving the coil $a$ and a concentric reduced outer portion corresponding to the reduced diameter of the straight uncoiled stem portion $b$. The inner end portion of the coil $a$ extends substantially tangentially to form a laterally projecting locking tongue 14, extending transversely to the coöperative screw-threaded parts and adapted to have locking engagement with the bolt 1, similarly to the locking tongue 4 (Figs. 1 to 4, inclusive), and contained in a corresponding recess at the inner face of the nut 13. From the outer end of the straight stem portion $b$ an actuating lever 15 projects laterally and extends transversely of the screw-threaded parts and is provided with latching means or releasable holding means such as heretofore described.

The chief feature of differentiation from the hereinbefore described constructions of the modified construction illustrated at Figs. 7 and 8 resides in the fact that in this modification that feature is omitted by reason of which in the former constructions the resilient stem had also an actuating function, the longitudinally extending stem 16 in this last modification having the resilient function and not the actuating function. The stem 16 is of the coiled type and is contained in a cylindrical well extending part way through a nut 17 from its inner end. The inner end turn of the coiled stem 16 extends substantially tangentially and forms a projecting locking tongue 18, extending transversely to the screw-threaded parts and engageable at a locking angle with the threads of the bolt 1, a recess extending from the mouth of the well to the bolt-receiving aperture being provided for the tongue 18. Several of the turns of the coiled stem 16 adjacent to the tongue 18 are free to rotate in the well but the other end turns of the coil adjacent to the bottom of the cylindrical well are firmly gripped and held from any movement by a malleable metal plug 19, which is so strongly upset in the bottom portion of the well as to substantially embed the end turns of the coil partially in such plug and partially in the side wall of the well, as clearly shown in Fig. 7. The plug also effectively prevents the locking member from becoming detached from the nut 17 when the nut is not screwed on a bolt or other coöperative screw-threaded part. To enable the locking tongue 18 to be unlocked or disengaged from the threads of the bolt for unscrewing the nut 17, a small hole 20 is provided extending longitudinally of the nut 17 from the outer end thereof to the locking-tongue-containing recess, through which any suitable key or tool may be inserted to press the locking tongue 18 to non-locking position and hold it there while the nut is unscrewed. The simple and inexpensive construction of this modification has proved entirely effective in its locking function and could well be employed upon nuts which require to be only infrequently removed or unscrewed.

Figs. 9 to 13, inclusive, illustrate modifications along the same general lines of construction shown at Figs. 6 and 7.

At Fig. 9 a coiled resilient torsional stem 34 is provided extending part way longitudinally through a nut 35 from the inner face thereof, the coils of the stem being rotatably contained in a well in the nut. The inner turn of the coil 34 is laterally extended to form a projecting locking tongue 36 extending transversely of the screw-threaded part or nut 35, the inner face of the nut having a recess therein for receiving the locking tongue. From the other end turn of the coil at the bottom of the coil-receiving well an anchor 37 projects longitudinally of the nut and coil substantially parallel to the axis of the coil 34 but eccentric to such axis, such anchor being conveniently formed by turning outwardly the terminal portion of the last coil. The anchor 37 is firmly set in a small hole at the margin of the bottom of the coil-receiving well, as clearly shown in Fig. 9. The anchor 37, besides preventing rotation of the stem 34 as a whole, also retains the locking member in the nut when the nut is not in use upon a coöperative screw-threaded part. A small hole 38 is provided longitudinally through the nut for the insertion of a key to effect unlocking, as hereinbefore described in reference to Figs. 7 and 8.

In the constructions shown in Figs. 10 and 11 the means for anchoring in place the locking member are slightly modified from that just described in reference to Fig. 9. As in the last described construction, a cylindrical well and corresponding recess are provided in a nut 39 and a coiled torsional spring stem 40 has its coils rotatively contained in the well and has its inner coil continued tangentially to form a projecting locking tongue 41. At its end adjacent to the bottom of the well the last coil of the stem 39 is turned first slightly downward and then transversely substantially diametrally across the axis of the coil to form an anchor 42, which is received into a corresponding transverse slot formed substantially diametrally across the bottom of the well, and the metal of the nut is upset at the bottom of the well along the edges of such slot to firmly grip and hold the anchor and thereby to restrain the coil as a whole from rotation in the well and to secure the locking member in the nut. An unlocking hole 43 is provided for the insertion of an unlocking key to engage and push back the locking tongue 41.

The construction illustrated in Figs. 12 and 13 presents further modifications in the anchoring means or holding means for the locking member. In this construction the stem-containing well in the nut 44 is of oval or elliptical cross-section, as shown in Fig. 12 and is provided at its mouth with the usual tongue-receiving recess. The resilient stem of the locking member is composed of a cylindrical coil 45, the inner turn of which is extended to form a longitudinally projecting locking tongue 46, as seen in Fig. 12. The last turn at the other end of the stem extends slightly laterally and then turns downwardly and transversely to form an anchor 47. This anchor, before the insertion of the locking member in the nut, has a slight curve in a plane coincident with the axis of the stem, the convexity of the curve being directed toward the stem. The free end of the anchor and the bend formed by the last turn at the other end of the anchor project laterally beyond the coiled stem 45 as shown in Fig. 13. When the locking member has been placed in position in the well with the anchor 47 extending in the direction of the transverse elongation of the well, as shown in Fig. 12, a punch or other suitable tool may be inserted through the turns of the coiled stem 45 to drive down the convexly curved middle portion of the anchor 47 and thereby to thrust the ends of the anchor into firm engagement with and to some extent to embed them in the side wall of the well, as shown in Fig. 12. The laterally projecting locking tongue 46 extends in a longitudinal plane substantially at right angles to the longitudinal plane occupied by the anchor 47, so that the locking tongue 46 extends substantially at right angles to the major axis of the oval or elliptical well. By reason of this arrangement the locking tongue 46 in its locking function is strongly supported by the side wall of the well against end thrust. The anchor 47 restrains the end of the stem 45 at the bottom of the well from rotation and also serves to secure the locking member in place in the nut. A key-hole 48 is provided in the nut for effecting unlocking.

In the construction illustrated at Figs. 14 and 15 the modification is in the means for holding in place the resilient torsional stem of the locking member. In this construction the locking member has a non-coiled straight cylindrical wire torsional spring stem 65 which is inserted into a well extending part way through a nut 66 from the inner end thereof and is firmly held in such well from bodily rotation or displacement by a deformable plug 67, driven tightly in the well at the side of the torsional spring stem 65. The plug 67 is of less length than the depth of the well, so that a portion of the stem 65 is left free to act as a torsional spring for pressing into locking position a locking tongue 68 projecting laterally from the disengaged end of the stem 65 and extending transversely of the screw-threaded parts at the inner face of the nut 66 and engageable with a coöperative screw-threaded part, shown as the ordinary bolt 1, the locking tongue 68 occupying a tongue receiving recess in the inner face of the nut, the same as in the several hereinbefore described constructions. An unlocking hole 69 extends longitudinally through the nut 66. Although the well is of larger diameter than the resilient torsional stem, such stem is located at one side of the well in such manner, as shown in the drawings, that the side wall of the stem-containing and plug-receiving well receives the locking thrust or end thrust of the locking tongue 68.

The construction illustrated at Fig. 16 embodies a locking member having an actuating lever 76 located in a lever-containing recess which is cut through on the outer face of a nut 77 from the marginal edge thereof into the bolt-receiving aperture, so that in this construction there is no inner side wall of the recess forming an abutment to limit the inward movement of the actuating lever 76. This construction indicates that the actuating-lever-receiving recess may be cut through into the bolt-receiving aperture of the nut whenever in any case for any reason this is found preferable.

The reversely constructed and reversely arranged locking members are illustrated in Fig. 17 and are shown as of the type illustrated at Figs. 5 and 6, the reverse construction and arrangement of the two locking members enabling one of the locking members to lock the nut 78 from rotation in one direction while the other locking member locks the nut from rotation in the opposite direction. In some situations it is desirable to lock the coöperative screw-threaded parts from relative rotation in either direction. Either or both of the locking members may be set at the non-locking position to permit the nut 78 to be adjusted in either direction. From this example it is evident that any of the constructions of locking members may be duplicated in reversed form so as to lock the coöperative screw-threaded parts from relative rotation in either or both directions, as desired.

Figs. 18 and 19 illustrate another modification belonging to the type in which a coiled resilient torsional stem is employed which is not an actuating stem, but which resiliently effects locking engagement. In this particular construction the coiled stem 79 is of elliptical or oval cross-section and carries at one end a laterally projecting locking tongue 80. At its other end, away from the locking tongue, the stem 79 has several of the end turns of its coil firmly forced into a well of corresponding elliptical cross section formed in a nut 81. The end turn of the coil adjacent to the tongue 80 projects above the well for more resiliently supporting the locking tongue 80, which occupies a recess in the inner face of the nut substantially similar to the locking-tongue-containing recesses hereinbefore described. The coacting elliptical stem and elliptical well hole prevent rotation of the stem 79 as a whole and the extremely close fit of the end turns of the coiled stem obviate the loss of the locking member from the nut. A key hole 82 extends longitudinally through the nut 81 for the insertion of an unlocking key.

It is obvious that various modifications may be made in the constructions shown and above particularly described within the principle and scope of my invention.

I claim:

1. Means for locking from unintentional relative rotation two screw-threaded engaging parts, comprising, in combination with such parts, a locking member carried by one of the screw-threaded parts and coactive with the other screw-threaded part; such locking member comprising a spring coil forming a combined resilient torsional stem and rockable actuating stem extending longitudinally of the screw-threaded part by which the locking member is carried, locking means carried by such stem at one end thereof and adapted to have locking engagement with the other screw-threaded part, and releasable actuating means for holding the stem at the other end thereof from rotation and thereby releasably holding the locking means in locking position.

2. Means for locking from unintentional relative rotation two screw-threaded engaging parts, comprising, in combination with such parts, a locking member carried by one of the screw-threaded parts and coactive with the other screw-threaded part; such locking member comprising a spring coil forming a resilient torsional stem extending longitudinally of the screw-threaded part by which the locking member is carried, and locking means carried by such stem for having locking engagement with the other screw-threaded part.

3. Means for locking from unintentional relative rotation two screw-threaded engaging parts, comprising, in combination with such parts, a locking member carried by one of the screw-threaded parts and coactive with the other screw-threaded part; such locking member comprising a spring coil forming a resilient torsional stem extending longitudinally of the screw-threaded part, and a lateral extension from one of the turns of the coil forming a locking tongue extending transversely of the screw-threaded part.

4. Means for locking from unintentional relative rotation two screw-threaded engaging parts, comprising, in combination with such parts, a locking member carried by one of the screw-threaded parts and coactive with the other screw-threaded part; such locking member comprising a spring coil forming a resilient torsional stem extending longitudinally of the screw-threaded part, means for restraining one of the turns of the coil from rotation relatively to the screw-threaded part by which the locking member is carried, and a lateral extension from another of the turns of the coil forming a locking tongue extending transversely of the screw-threaded part.

5. Means for locking from unintentional relative rotation two screw-threaded engaging parts, comprising, in combination with such parts, a locking member carried by one of the screw-threaded parts and coactive with the other screw-threaded part; such locking member comprising a spring coil forming a combined resilient torsional stem and rockable actuating stem extending longitudinally of the screw-threaded part, a lateral extension from one of the turns of the coil forming a locking tongue extending transversely of the screw-threaded part, a lateral extension from another of the turns of the coil forming an actuating lever extending transversely of the screw-threaded part, and latching means for releasably engaging the actuating lever.

6. Means for locking from unintentional relative rotation two screw-threaded engaging parts, comprising, in combination with such parts, a locking member carried by one of the screw-threaded parts and coactive with the other screw-threaded part; such locking member comprising a spring coil forming a combined resilient torsional stem and rockable actuating stem extending longitudinally of the screw-threaded part, one of the end turns of the coil being extended laterally to form a laterally-projecting locking tongue extending transversely of the screw-threaded part, and the other end turn of the coil being extended laterally to form a laterally projecting actuating lever extending transversely of the screw-threaded part, a keeper being provided on the screw-threaded part with which the actuating lever is releasably engageable.

7. Means for locking from unintentional relative rotation two screw-threaded engaging parts, comprising, in combination with such parts, a locking member carried by one of the screw-threaded parts and coactive with the other screw-threaded part; such locking member comprising a spring coil forming a resilient torsional stem extending longitudinally of the screw-threaded part, means for restraining the torsional stem at one location thereof from rotation relatively to the screw-threaded part by which the locking member is carried, and locking means carried by such stem at another location longitudinally thereof and adapted to have locking engagement with the other screw-threaded part.

8. A nut having a plurality of parallel bores, one of which is screw-threaded, there being a recess in the inner face of said nut communicating with all of said bores, in combination with a locking member under torsional tension within said recess and extending across one of the unthreaded bores and having a stem extending into another of the unthreaded bores; said first-mentioned unthreaded bore arranged to receive a means for releasing said locking member, for the purpose set forth.

In testimony whereof I have affixed my signature in presence of two witnesses.

MORRIS JACOBS.

Witnesses:
 WM. ASHLEY KELLY,
 BERNARD COWEN.